United States Patent [19]
Foldvary et al.

[11] Patent Number: 4,459,435
[45] Date of Patent: Jul. 10, 1984

[54] TELEPHONE PRIVACY APPARATUS

[76] Inventors: Peter Foldvary, 11640 Kiowa Ave., Los Angeles, Calif. 90049; Stuart Mirell, 10816 Cushdon, Los Angeles, Calif. 90064

[21] Appl. No.: 341,480
[22] Filed: Jan. 21, 1982
[51] Int. Cl.³ .............................................. H04M 1/00
[52] U.S. Cl. .............................. 179/84 C; 179/84 A
[58] Field of Search ............... 179/84 A, 84 C, 84 R, 179/16 D, 2 A, 6.16

[56] References Cited
U.S. PATENT DOCUMENTS
3,777,069  12/1973  Lee ................................... 179/84 R Primary Examiner—Harold I. Pitts
Assistant Examiner—James L. Dwyer
Attorney, Agent, or Firm—Fulwider, Patton, Rieber, Lee & Utecht

[57] ABSTRACT

A privacy circuit for selective connection to a telephone line to provide for silencing of a preselected number of ringing signals before subsequent ringing signals are transmitted to a telephone to be heard by a user. The circuit derives power entirely from the ringing signal on the telephone line, counts the number of initial ringing signals and then actuates an electronic alternating-current switch when the preselected number of ring signals has been detected. A discharge circuit resets the device after ringing signals have ceased for a preselected time. The privacy circuit may also be used with its own annunciator rather than connected to a telephone.

10 Claims, 5 Drawing Figures

TELEPHONE PRIVACY APPARATUS

BACKGROUND OF THE INVENTION

This invention relates generally to telephone circuits, and, more particularly, to telephone privacy circuits by means of which the audible ringing signal applied to a telephone may be selectively suppressed, to exclude the disturbance of incoming cells of a casual or unimportant nature while still admitting urgent calls.

For many people, the disturbance created by unwanted telephone calls cannot be avoided by answering the telephone and quickly terminating each call. Usually, a person who wishes to completely avoid disturbance will resort to one of two measures. First, the person may remove the telephone handset from its cradle, thereby causing any caller to receive a busy signal. However, this ties up a telephone line and is, accordingly, objectionable to the telephone company. Moreover, the telephone company may transmit a loud warning signal to the earpiece of the telephone as a deterrent against this privacy measure. More importantly, the person who disables his telephone in this manner is unable to receive any telephone calls at all, regardless of their urgency.

A second privacy measure is achieved by interrupting the electrical connection between the telephone receiver and the telephone line. Such an interruption may be readily effected by removing the telephone cord from its wall connection or, more conveniently, by installing an on-off switch anywhere along the telephone cord or at the telephone itself. Anyone calling such a disconnected telephone would not be aware of the disconnection and would hear a normal ringing tone. Privacy is then absolute, but important calls are never received so long as the telephone remains disconnected.

Silencing apparatus is known in the art by which the audible ringing signal is silenced by a preselected number of rings. Callers who are aware of the existence of the privacy apparatus can allow their call to "ring through" after the preselected number of rings, if they feel that their call is of sufficient urgency to interrupt the called party's privacy. However, most casual callers will hang up before the preselected number of silenced rings. In U.S. Pat. No. 3,777,069 issued in the name of Lee, ring silencing is achieved by selectively reducing the magnetomotive force applied through a ringer circuit to a value below that which is necessary to actutate the telephone bell. The circuitry of the Lee device is relatively complex and is powered by batteries.

In other patents, typified by that to Lutz et al. (U.S. Pat. No. 2,715,161), a silent ringing interval is measured by the charge or discharge time of a capacitor, and a privacy tone signal is transmitted to the caller. On receipt of the signal, the caller may either persist until the silent ringing interval has elapsed or may hang up. The Lutz system is also battery powered. Similar principles are disclosed in a patent to Friend at al. (U.S. Pat. No. 3,126,453) and Grambsch (U.S. Pat. No. 3,226,489). The Friend system also uses battery power, while the Grambsch system employs connection to 115 volt, 60 Hz ac power.

Because a telephone privacy device might be used for many hours each day, with the use of battery power, such a device would be subjected to failure at inopportune times. The requisite batteries would also result in a not insignificant cost of operation. The use of ac power in conjunction with such a privacy circuit also poses reliability problems. Disruption of the ac power supply, as in a natural disaster, when emergency telephone communication is essential, would result in loss of function of the user's telephone, which might be otherwise operational. Furthermore, the interconnection of telephone networks with ac power poses a potential safety hazard and is very strictly regulated by the Federal Communications Commission in the United States. As a practical matter, there is also a problem in positioning telephone equipment adjacent to convenient ac power outlets.

It will be apparent that privacy circuits of the prior art are relatively complex and require ancillary power sources. Alternatively, the power which a device may draw directly from the telephone line itself is strictly regulated in the United States by the Federal Communications Commission, and in many other countries by similar governmental agencies. Such devices must be designed to draw very little power both in their active and quiescent states of operation. Telephone privacy circuits of the prior art have apparently been unable to meet these requirements and there is, therefore, a significant need for a telephone privacy circuit which operates independently of ancillary power supplies, which is simple enough to be housed, if desired, in a conventional telephone, and which performs the desired privacy function. The present invention satisfies all of these requirements.

SUMMARY OF THE INVENTION

The present invention resides in a privacy circuit for connection to a telephone line. Briefly, and in general terms, the circuit comprises means for selectively intercepting ringing signals transmitted over the line to a telephone, ringing signal counting means, for generating a control signal upon the detection of a preselected number of consecutive ringing signals, and switching means responsive to the control signal generated after the preselected number of consecutive ringing signals, for switching subsequent ringing signals through to the telephone, and wherein power for the ringing signal counting means and the switching means is derived entirely from the ringing signal on the telephone line.

More specifically, the apparatus of the invention includes alternating-current coupling means to remove any direct component from the telephone ringing signal, rectifying means to provide direct-current pulses from the alternating-current ring signals, voltage regulating means to clamp the direct-current pulses to a preselected value, capacitive counting means for accumulating a charge in response to each clamped direct-current pulse, and alternating-current switching means for switching the original ringing signal through to the telephone in response to the detection of a selected number of ring signals by the capacitive counting means.

In one preferred embodiment of the invention, the alternating-current switching means includes a bridge rectifier circuit through which the ringing signals are passed, and a transistor circuit coupled to the bridge rectifier circuit and to the capacitive counting means in such a manner that the transistor circuit is rendered conductive when the counting means has detected the desired number of consecutive ringing signals. The bridge rectifier circuit is then simultaneously rendered conductive to transmit the ringing signals through to the telephone.

In accordance with another aspect of the invention, discharge means are provided for discharging the capacitive counting means between uses of the privacy circuit. A simple discharge resistor used for this purpose would also be effective to discharge the counting means between successive rings that were being counted, but the discharge means of the invention does not operate to discharge the capacitive counting means until the lapse of a preselected time after the last detected ringing signal.

More specifically, the discharge means includes a capacitor and charging circuit, the capacitor being charged concurrently with the capacitive counting means, a discharge resistor in parallel with the capacitor, and a diode connecting the capacitive counting means and the additional capacitor. The circuit constants of these elements are selected such that the capacitor in the discharge circuit is charged to a higher voltage than the capacitor in the capacitive counting means, and the diode is effective to block connection of the counting means to the discharge circuit so long as the voltage on the capacitor in the discharge circuit is higher than the voltage on the capacitor in the counting means. After a preselected time during which no ringing signals occur, however, the capacitor in the discharge circuit discharges sufficiently to provide a forward bias voltage across the diode. The capacitor in the counting means is then effectively connected to the discharge resistor, whereupon both capacitors are rapidly discharged.

Alternatively, instead of utilizing a bridge rectifier, a pair of diodes may be connected back to back, each having a transistor connected across its terminals. The effect is the same, since the alternating current passing through the diodes can do so only if both of the transistors are conductive.

It will be apparent that the circuit of the invention may be connected to a telephone in a number of different ways. First, the circuit could be interposed in the telephone line connection to the telephone. The apparatus would then contain its own bypass switch, which in one position would bypass the privacy apparatus so that the telephone could be operated normally. For privacy operation, the switch would be placed in its other position. Upon hearing the ringing sound following the preselected silent rings, the user could return the switch to its former position and answer the telephone in the normal manner. Alternatively, the entire apparatus could easily be housed within the telephone itself, the bypass switch being installed on the telephone case.

As another alternative, the apparatus of the invention could be used as a stand-alone device without a telephone, but with the addition of an integral annunciator such as a distinctive buzzer, a piezo tone generator, or a conventional telephone bell ringer. In this manner, the apparatus could be left unattended in a central location of a residence, for example. For privacy operation, all of the telephones in the house would be unplugged or switched off in some manner. When "ringing through" occurred, the annunciator would sound and the user could re-connect any of the telephones in the house to answer the call.

It will be appreciated from the foregoing that the present invention represents a significant advance in the field of telephone privacy circuits. In particular, it provides a relatively uncomplicated circuit for operation on power derived solely from the ringing signal on the telephone line, and for operation in any of a number of desired modes. Other aspects and advantages of the invention will become apparent from the following more detailed description, taken in conjunction with the accompanying drawings.

DETAILED DESCRIPTION

Figure 1:
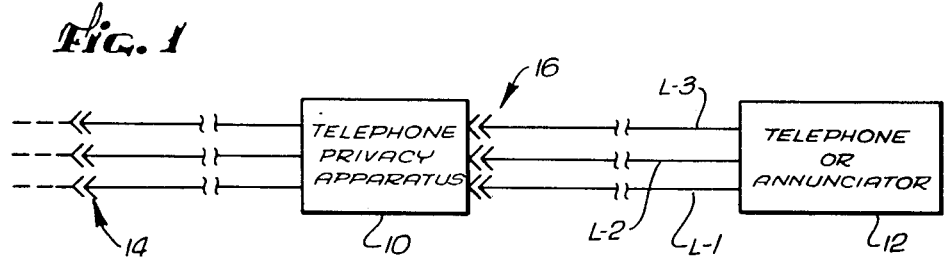
FIG. 1 is a simplified block diagram showing how the telephone privacy apparatus of the invention may be connected to a telephone receiver.

As shown in the drawings for purposes of illustration, the present invention is principally concerned with a telephone privacy apparatus, indicated by reference numeral 10, for connection to a telephone 12. As shown in FIG. 1, a telephone conventionally has three lines L-1, L-2 and L-3 connected to it. L-1 is a common line, L-2 is the ringing line and L-3 is the voice line. In the typical configuration shown in FIG. 1, the privacy apparatus 10 is connected in series with the telephone lines by connectors 14 and 16, which would most conveniently take the form of modular type connectors.

Figure 2:
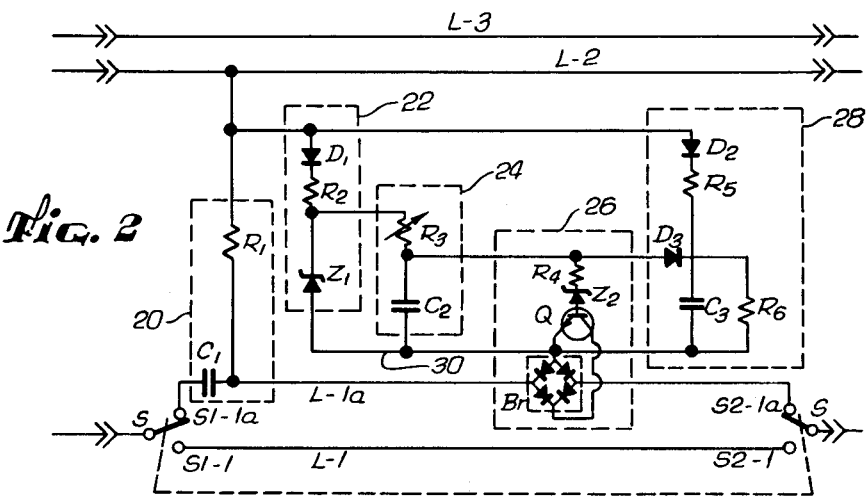
FIG. 2 is a schematic diagram of the telephone privacy apparatus of the invention.
Figure 3:
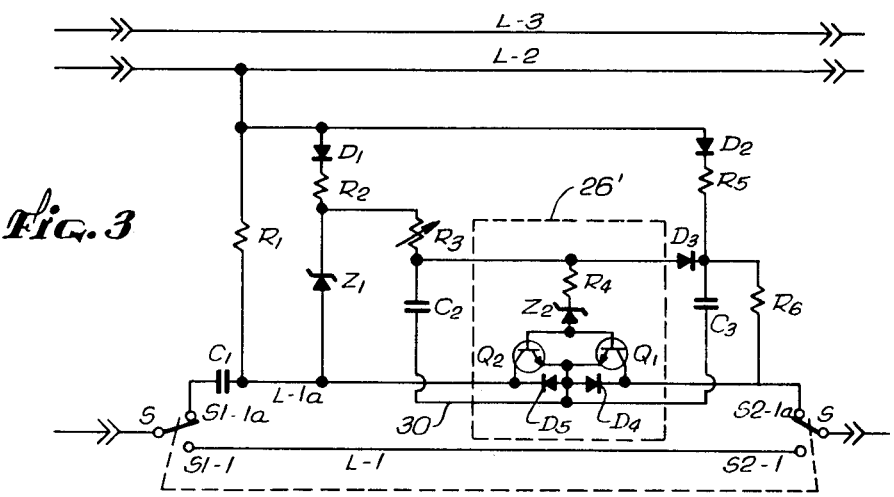
FIG. 3 is a schematic diagram of an alternate embodiment of the telephone privacy apparatus.

As shown in FIG. 2 and FIG. 3, lines L-2 and L-3 are connected straight through the apparatus 10 without interruption. Line L-1, on the other hand, has two possible paths through the apparatus 10. The apparatus also includes a double-pole-double-throw switch S. When the switch S is in one position, the apparatus is bypassed and the line is connected straight through by the path indicated by L-1 in FIGS. 2 and 3. When the switch S is in the other position, however, an alternate path L-1$a$ is established through the apparatus 10. The apparatus of the invention comprises an alternating-current (ac) coupling circuit 20, a voltage regulation circuit 22, a capacitor charging circuit 24, an ac electronic switch 26, and a discharging circuit 28. The ac coupling circuit comprises a capacitor $C_1$ connected in series in the line L-1$a$ and a resistor $R_1$ connected between line L-2 and the capacitor $C_1$.

Figure 4:
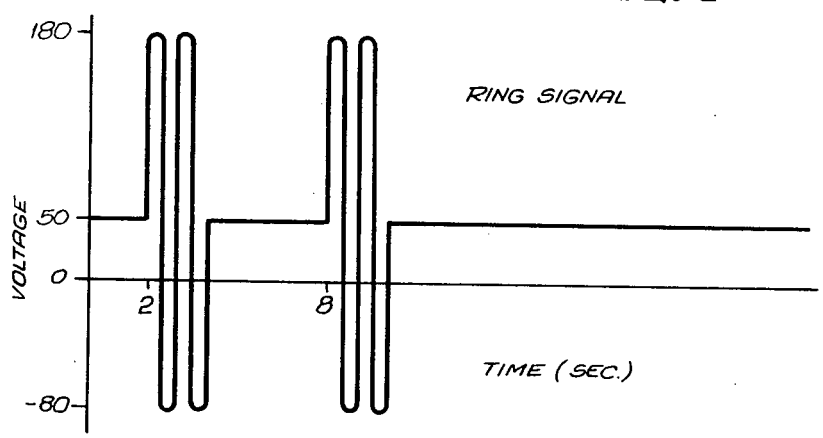
FIG. 4 is a graph showing in simplified form the waveform of a telephone ringing signal.

As shown in FIG. 4, a telephone ringing signal includes intermittent ac components which are typically 130 volts peak, 20 Hz bursts on for 2 seconds and off for 4 seconds, superimposed on a continuous direct-current (dc) component of approximately 50 volts. As a first step to obtaining a voltage signal indicative of a selected number of rings, the dc component on the ring signal must first be removed, and this is accomplished by the ac coupling circuit 20. The voltage regulation circuit 22 includes a diode $D_1$, a resistor $R_2$ and a zener diode $Z_1$, all connected in series. The diode $D_1$ has its anode terminal connected to line L-2 and its cathode terminal connected to the resistor $R_2$, the other terminal of which is connected to the zener diode $Z_1$, the anode of which is connected to a bus 30.

The charging circuit 24 comprises an adjustable resistor $R_3$ and a capacitor $C_2$, which accumulates a charge proportional to the number of detected ring signals. The variable resistor $R_3$ is connected by one terminal to the junction of resistor $R_2$ and the zener diode $Z_1$, and by the other terminal to one terminal of the capacitor $C_2$. The other terminal of $C_2$ is connected to the bus 30.

The electronic switch 26 includes a bridge rectifier Br connected in series into line L-1a, a transistor Q, a zener diode $Z_2$ and a resistor $R_4$. The emitter of the transistor Q is connected to one output terminal of the bridge rectifier Br and the collector is connected to the other output terminal of the bridge. The emitter of transistor Q is also connected to bus 30. The zener diode $Z_2$ and the resistor $R_4$ are connected in series to the base terminal of the transistor Q, resistor $R_4$ being also connected to the junction of resistor $R_3$ and capacitor $C_2$.

In the privacy setting of the switch S, the ac coupling circuit 20 causes the alternate conductor L-1a and the ringing conductor L-2 to "see" no voltage at all when the ringing signal is not present and only the ac component when the ringing signal is present. During the ringing signal, the voltage regulator circuit 22 produces uniform square wave dc pulses across the zener diode $Z_1$. These pulses are relatively independent of the particular ringing voltage present on the user's telephone line. Diode $Z_1$ may either be a zener diode or may be replaced by a neon bulb, since either would provide a similar voltage clamping characteristic. The neon bulb would also provide an indication of the circuit operation, but this visual aspect is not relevant to the present invention.

The charging circuit 24 provides a proper RC constant to permit the counting capacitor $C_2$ to reach some particular voltage, e.g. 16 volts, after the preselected number of ringing signals have been received, e.g. seven. If zener diode $Z_2$ is also a 16-volt zener, then transistor Q, and therefore the ac electronic switch 26 becomes conductive when the voltage on capacitor $C_2$ reaches 16 volts. At this point, the alternate conductor L-1a can transmit an ac ringing signal to the telephone receiver. It will be seen then that the purpose of the bridge Br is to allow a unidirectional device such as a transistor to control an alternating current signal. The alternating current flows into the bridge Br from both directions along the alternate conductor L-1a, but is always shunted by the bridge from the collector to the emitter terminal of transistor Q, which thereby controls current flow along the alternate conductor.

Since the zener diode $Z_2$ causes a 16-volt drop across its own terminals, the base-emitter terminals of transistor Q will initially "see" only a fraction of a volt upon conductance of zener diode $Z_2$, this voltage increasing slightly as capacitor $C_2$ charges further. After the ringing signal has been transmitted through to the telephone, and as long as a ring signal persists, the counting capacitor $C_2$ will remain very nearly at a constant threshold voltage, determined by zener diode $Z_2$, since zener diode $Z_2$ will shunt any excess charge into the base terminal of transistor Q.

When the ringing signal from an incoming call ceases, either by reason of the caller's hanging up or when the called party answers the telephone, the voltage on the counting capacitor $C_2$ would, without intervention, diminish very slowly over a period of a number of minutes as the charge was dissipated by natural capacitor leakage. However, until the counting capacitor $C_2$ voltage approaches practically a zero level, any subsequent incoming call would be able to ring through in less than the preset number of silent rings, because of the presence of residual charge from the previous call. This problem could be circumvented by means of a resistor in parallel with the counting capacitor $C_2$, in order to dissipate the residual charge more rapidly. However, this resistor would also partially discharge the counting capacitor between successive ringing signals. Therefore, a sufficiently high resistance would have to be chosen to limit the discharge such that a net voltage gain occurs between successive rings, and the voltage ultimately reaches the threshold value after the preset number of ringing signals.

It will be apparent that, in such an arrangement, partial discharge between successive ringing signals will effectively shorten the length of each audible ring because the beginning of each ringing signal is expended in recharging the counting capacitor up to the threshold voltage. Consequently, the use of a discharge resistor in this manner represents a compromise between maintaining a reasonably long audible ring and returning the counting capacitor to its discharged state in a reasonably short time after the ring signals have ceased.

Figure 5:
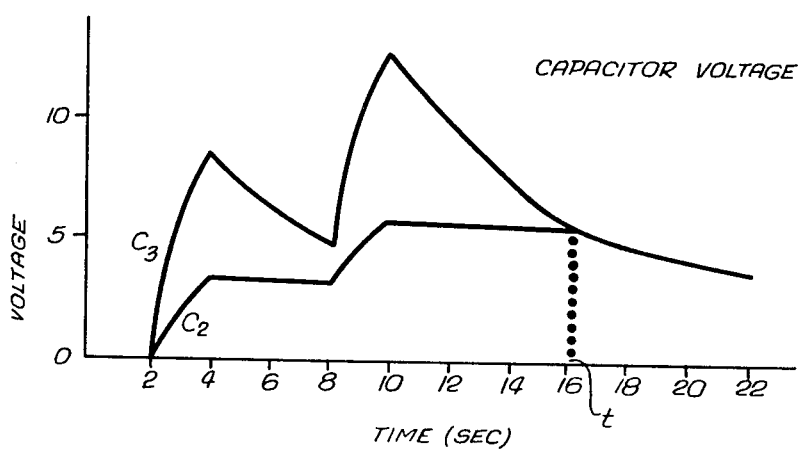
FIG. 5 is a graph showing the voltages across two capacitors in the privacy apparatus of FIGS. 2 and 3.

A more attractive solution to this problem is provided by the discharge circuit 28, which comprises a diode $D_2$, a resistor $R_5$ and a capacitor $C_3$ connected in series between line L-2 and the common bus 30. Also included is a discharge resistor $R_6$ in parallel with the capacitor $C_3$, and another diode $D_3$ connected between the two capacitors $C_2$ and $C_3$, with its anode connected to $C_2$ and its cathode connected to $C_3$. In operation of the circuit, so long as the voltage on the capacitor $C_3$ is higher than the voltage on capacitor $C_2$ there can be no discharge of capacitor $C_2$ through the discharge circuit 28. Accordingly, the circuit constants of the discharge circuit 28 are chosen such that the capacitor $C_3$ will, during ringing signals, be charged to a higher voltage than the capacitor $C_2$. Between ringing signals, the capacitor $C_3$ will be discharged through resistor $R_6$, while capacitor $C_2$ will remain at a relatively constant voltage level, as shown by way of example in FIG. 5. However, the value of discharge resistor $R_6$ is chosen such that capacitor $C_3$ will not be discharged to the level of the voltage on capacitor $C_2$ during a typical silent period between two successive ringing signals. On the occurrence of the next ringing signal, both capacitors will be charged again, capacitor $C_2$ to an accumulated higher voltage, and capacitor $C_3$ to a somewhat higher voltage still, so that the diode $D_3$ never becomes forwardly biased. After a time, however, indicated by t in FIG. 5, with no new ringing signal incoming, the capacitor $C_3$ falls in voltage to the same voltage as $C_2$, and then both capacitors will be discharged through the resistor $R_6$ in a relatively rapid manner.

It will be recognized that the diode $D_3$ causes capacitor $C_3$ to serve as a blocking capacitor, since the counting capacitor $C_2$ is prevented from discharging through resistor $R_6$ while the voltage of capacitor $C_3$ exceeds that of capacitor $C_2$, as is the case during the entire ringing signal sequence. However, once the ringing signal ceases for any reason, the voltage on capacitor $C_3$ will rapidly fall to the voltage on capacitor $C_2$, whereupon both capacitors will discharge rapidly through resistor $R_6$. Thus, without intervention on the part of the user, the circuit of the invention automatically resets itself shortly after each incoming call, whether or not the ring count limit has been exceeded.

In this manner, the privacy circuit subjects subsequent calls to the full limit of silent ringing before "ring through" is effected. When the user ultimately answers the telephone, in response to a ring through, the user moves the switch S from its privacy position to the normal position, and the handset is lifted as usual to answer the telephone. These two operations may be performed in either order. Since the telephone call is not answered by action of the privacy circuit itself, the caller is not charged by the telephone company for a completed call if the user does not actually answer.

As shown in the circuit of FIG. 1, it is the common line L-1 that is used and intercepted in the privacy circuit. When the switch S is set to the privacy setting, the user is unable to dial out with his telephone since the common line lacks a dc connection in the privacy setting. For the same reason, of course, it is necessary to return the switch to the normal position when responding to a "ring through". As an alternative, it is possible to connect the circuit of the invention with the lines L-1 and L-2 interchanged. The common line L-1 is then always connected straight through the apparatus 10, while the ring line L-2 is selectively intercepted by operation of the switch S. In this alternative configuration, the circuitry would permit the user to respond to a "ring through" while leaving the switch in the privacy setting and would also permit the user to dial out while the switch is in the privacy setting. The only drawback of this approach is that many telephone systems utilize a two-conductor configuration in which lines L-2 and L-3 are coupled in some manner. Accordingly, it is necessary to ensure that the lines L-2 and L-3 are not coupled inside the telephone receiver itself before utilizing this alternate configuration.

In the alternate embodiment of FIG. 3, it is only the electronic ac switch which is different from the corresponding circuitry in FIG. 2. The switch in FIG. 3 is indicated as 26' and it includes resistor $R_4$ and zener diode $Z_2$, as before. However, instead of the bridge rectifier there are two diodes $D_4$ and $D_5$ connected back to back in the line L-1a. Also, there are two transistors $Q_1$ and $Q_2$ with their base terminals commonly connected to the zener diode $Z_2$ and their emitter terminals commonly connected to anode terminals of the diodes $D_4$ and $D_5$, as well as to the common bus 30. The collector terminals of the transistors $Q_1$ and $Q_2$ are connected to the respective cathode terminals of the diodes $D_4$ and $D_5$. It will be apparent that this arrangement provides the same effective control of the alternating-current signal on line L-1a as the embodiment shown in FIG. 2.

A number of other configurations are possible utilizing other solid state switching devices to replace the elements $Z_2$, Q, and Br. For example, a silicon controlled rectifier (SCR) might be used in place of transistor Q, or a silicon unilateral switch, which is similar to an SCR but includes a built in zener junction, could replace the zener diode $Z_2$ and the transistor Q. Moreover, a triac, which is essentially a pair of oppositely oriented SCR's, could replace the transistor Q and the bridge Br. As a further example, a silicon bilateral switch, which is similar to a triac with a built-in zener junction, could replace all of the components including the zener diode $Z_2$, the transistor Q and the bridge rectifier Br.

It is believed to be a significant aspect of the novelty of the present invention that a complex sequence of automated operations is accomplished with exceedingly few components and without the use of any ancillary power source, power being derived solely from the ringing signal. It is the object of this invention and other similar circuits that only calls of an urgent nature ring through to the caller. It is, therefore, essential that the invention function in an exceptionally reliable manner, since failure to operate would be evidenced only by the non-receipt of urgent calls. Since the invention operates without ancillary power sources, it meets this requirement. Moreover, it may be conveniently incorporated inside a standard telephone receiver, with only the privacy switch accessible from the outside. On the other hand, the housing of a standard telephone receiver is not readily adaptable to receive batteries or to the interconnection of ac power.

In accordance with another aspect of the invention. the privacy circuit 10 may be equipped with its own annunciator instead of being coupled to a telephone. The circuit of the invention could then be positioned in a central location within a household, and left unattended but in constant operation. Whenever an incoming call exceeded the preset number of rings, the annunciator would be actuated and the user could accept the call at any telephone receiver in the household, each such telephone preferably being equipped with a disconnection switch. When privacy was desired, all of the receivers could be disconnected and only the privacy circuit would remain connected to the line.

It will be appreciated from the foregoing that the present invention represents a significant advance in the field of telephone privacy circuits. In particular, the invention provides a relatively uncomplicated, compact and reliable device for selectively silencing the ringing signal on a telephone line without the need for an ancillary power supply and without sacrificing any performance characteristics of the telephone. It will also be appreciated that, although specific embodiments of the invention have been described in detail for purposes of illustration, various modifications may be made without departing from the spirit and scope of the invention. Accordingly, the invention is not to be limited except as by the appended claims.

We claim:

1. For connection to a telephone line, a telephone privacy circuit comprising:
    means for selectively intercepting ringing signals normally transmitted to a telephone or annunciator connected to the telephone line;
    ringing signal counting means responsive to the selective intercepting means, for generating a control signal upon the detection of a preselected number of consecutive ringing signals; and
    switching means reponsive to the control signal generated by said ringing signal counting means, for blocking conductance of the ringing signals to a telephone in the absence of the control signal, and for switching subsequent ringing signals to the telephone in the presence of the control signal;
    and wherein electrical power for said ringing signal counting means and said switching means is derived solely from the ringing signal present on the telephone line.

2. A telephone privacy circuit as set forth in claim 1, wherein said ringing signal counting means includes:
    alternating-current coupling means to remove any direct-current component from the ringing signal and to effect direct-current isolation of said ringing signal counting means from the telephone line;
    rectifying means to provide direct-current pulses from the ringing signals;
    voltage regulating means to clamp the direct-current pulses to a preselected value; and
    capacitive counting means, for accumulating a charge proportional to the number of rings intercepted, including resistive attenuation means and a counting capacitor connected in series with said resistive attenuation means, whereby the clamped direct-current pulses charge said counting capacitor through said resistive attenuation means.

3. A telephone privacy circuit as set forth in claim 1, wherein:
said means for selectively intercepting ringing signals includes a manually operable switch; and
said manually operable switch is installed on the telephone itself and said ringing signal counting means and said switching means are within the telephone.

4. A telephone privacy circuit as set forth in claim 1, wherein said switching means comprises:
a single transistor means connected in series with the telephone line and switchable between an off state in which conductance of ringing signals to a telephone are blocked, and an on state in which ringing signals are passed through to the telephone or annunciator;
a bridge rectifier coupled to said transistor means, to enable said transistor means to switch the ringing signal; and
a zener diode connecting said ringing signal counting means to the base of said transistor means, to block current flow to the base until the control signal is provided by said ringing signal counting means.

5. A telephone privacy circuit as set forth in claim 1, and further including discharge means for automatically resetting said ringing signal counting means after ringing signals have ceased for a preselected time interval, wherein electrical power for said discharge means is drawn only during the presence of the ringing signal and is derived solely from the ringing signal.

6. A telephone privacy circuit as set forth in claim 5, wherein said discharge means includes:
a discharge capacitor selected to be charged from the ringing signals to a higher voltage than said counting capacitor;
a discharge resistor in parallel with said discharge capacitor; and
a blocking diode connected between said discharge capacitor and said counting capacitor, to prevent discharge of said counting capacitor until sufficient time has elapsed, after the ringing signals, to permit the discharge capacitor voltage to fall below the counting capacitor voltage, whereupon both capacitors are discharged by said discharge resistor in the absence of ringing signal electrical power.

7. For connection to a telephone line, a telephone privacy circuit comprising:
a manually operable switch for bypassing said circuit in normal telephone operation, when no privacy function is required for the telephone line;
means responsive to said switch for coupling ac components of each ringing signal from the telephone line, both to permit detection of the pulses and to provide power for said circuit from the ringing signals;
rectifying means to provide dc pulses corresponding to ringing signals;
a counting capacitor charged by the dc pulses; and
a switching circuit responsive to the charge voltage on said counting capacitor, and operative to block the ringing signal from further progression along the telephone line until a predetermined number of ringing signals have been detected, after which said switching circuit is operative to switch subsequent ringing signals back onto the telephone line.

8. A telephone privacy circuit as set forth in claim 7, and further including discharge means, for discharging said counting capacitor rapidly after an interval in which no ringing signals are detected.

9. A telephone privacy circuit as set forth in claim 8, wherein said discharge means includes:
a discharge capacitor selected to be charged to a higher voltage than said counting capacitor;
a discharge resistor in parallel with said discharge capacitor; and
a blocking diode connected between said discharge capacitor and said counting capacitor, to prevent discharge of said counting capacitor until sufficient time has elapsed, after a ringing signal, to permit the discharge capacitor voltage to fall below the counting capacitor voltage, whereupon both capacitors would be discharged.

10. A telephone privacy circuit as set forth in claim 7, wherein said switching circuit includes:
a transistor having a base, emitter and collector;
a zener diode coupled between said base and said counting capacitor; and
a rectifier circuit connected in series with the telephone line and coupled between said emitter and collector;
and wherein said transistor is rendered conductive when said counting capacitor reaches a prescribed voltage, and said transistor provides a path for alternating-current ringing signals through said rectifier circuit in the telephone line.

* * * * *